Aug. 24, 1948.    A. F. KENYON    2,447,654
TORQUE CONTROL SYSTEM FOR ELECTRIC REEL MOTORS
Filed June 8, 1946
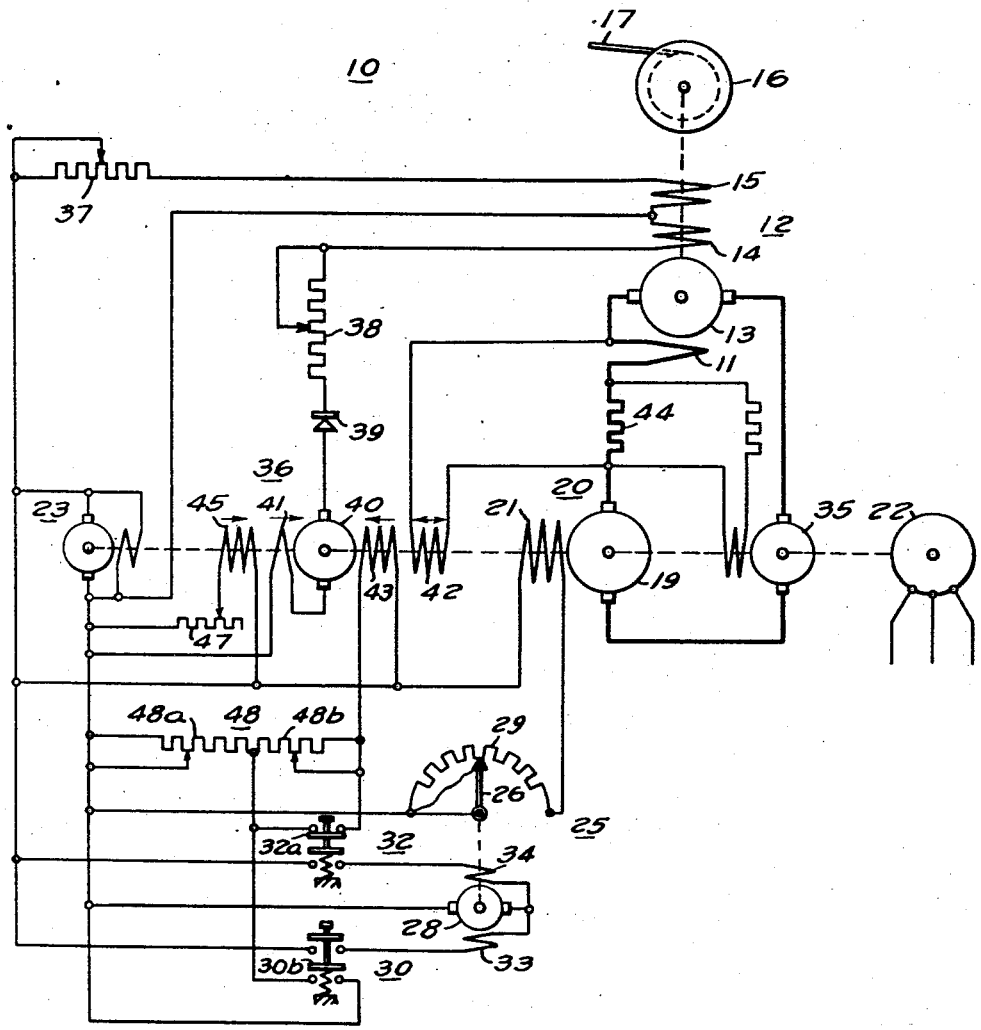
WITNESSES:
INVENTOR
Alonzo F. Kenyon.
ATTORNEY Patented Aug. 24, 1948

2,447,654

UNITED STATES PATENT OFFICE 2,447,654

TORQUE CONTROL SYSTEM FOR ELECTRIC REEL MOTORS

Alonzo F. Kenyon, Pittsburgh, Pa., assignor to Westinghouse Electric Corporation, East Pittsburgh, Pa., a corporation of Pennsylvania Application June 8, 1946, Serial No. 675,341

8 Claims. (Cl. 318—154)

1

My invention relates generally to control systems, and it has reference in particular to tension control systems for use with reel motors.

Generally stated, it is an object of my invention to provide a tension control system which is simple and inexpensive to manufacture, and which is reliable and efficient in operation.

More specifically, it is an object of my invention to provide for using a regulating generator for controlling the operation of a reel motor to maintain a predetermined tension in a strip of material which is being wound or unwound.

It is an object of my invention to provide for varying the torque of a reel motor to maintain a more nearly constant value of tension in a material during acceleration or deceleration of the material.

Another object of my invention is to provide a tension control system which is extremely flexible in operation and readily adjustable to provide a wide range of tensions, such as are necessary with materials of different sizes and grades.

Yet another object of my invention is to provide a predetermined inertia compensating effect in a reel control system of an adjustable torque type during acceleration or deceleration, regardless of the particular torque level at which the reel motor may be operating.

It is also an object of my invention to provide for using a separate variable bias field winding on a regulating generator controlling a reel motor for determining the particular percentage of full load torque at which the motor is to operate, and for using a reference field winding which is variably energized in accordance with predetermined operating conditions of the motor to compensate for varying torque demands.

It is an important object of my invention to provide for so controlling the regulating generator of a reel control system that the predetermined value of reel motor armature current which is normally maintained, may be varied during acceleration and deceleration to compensate for inertia and maintain more nearly constant strip tension.

Yet another object of my invention is to provide for varying the energization of the reference field winding of a regulating generator in response to increase or decrease of the field energization of a variable voltage generator supplying energy to a motor controlled by the regulating generator.

Other objects will, in part, be obvious and will, in part, be explained hereinafter.

In practicing my invention in one of its forms, the operation of a reel motor is controlled by using a regulating generator of the self-energizing type to vary the energization of the motor field winding. The regulating generator has a control field winding energized in accordance with the reel motor armature current, and a cumulative bias field winding whose energization is varied to determine at what percentage of full load torque the motor is to operate. A differential reference field winding energized from a substantially constant voltage source has its energization varied to compensate for varying torque conditions during acceleration and deceleration.

For a more complete understanding of the nature and scope of my invention, reference may be made to the following detailed description which may be studied in connection with the accompanying drawing in which the single figure is a diagrammatic view of a reel control system embodying the invention in one of its forms.

Referring to the single figure of the drawing, the reference numeral 10 may denote generally, a reel control system wherein a reel motor 12 having an armature 13, an interpole field winding 11, and main and auxiliary field windings 14 and 15, may be arranged to drive a reel 16 for coiling or uncoiling a strip of material 17.

The armature 13 of the reel motor 12 may be energized from any suitable power source, being, for example, connected to the armature 19 of a variable voltage main generator 20 having a field winding 21, and driven by a motor 22. The output voltage of the generator 20 may be controlled by connecting its field winding 21 to a suitable power source, such as a constant potential generator 23 driven by the motor 22, through a motor-driven rheostat 25.

The rheostat 25 may comprise a movable contact arm 26 actuated by a motor 28 for variably shunting portions of a resistance element 29, which may be connected in circuit relation with the field winding 21. The operation of the motor 28 may be controlled in any manner, such as by means of "raise" and "lower" pushbutton switches 30 and 32, which may be arranged to connect "raise" and "lower" field windings 33 and 34 respectively, of the motor to the constant potential generator 23.

A booster generator 35 may be connected in circuit with the armatures 13 and 19 and driven by the motor 22 to compensate for the I. R. drop of the reel motor 12.

In order to regulate the tension in the strip of material 17, a regulating generator 36 may be provided for controlling the operation of the reel motor. The auxiliary field winding 15 of the reel motor may be connected to the constant potential generator 23 through a suitable resistance 37 so as to provide a minimum stabilizing field for the reel motor which will cause the motor to operate at slightly faster than empty reel speed. The main field winding 14 of the reel motor may be connected in series circuit relation with the armature 40 of the regulating generator, a tuning rheostat 38 and a rectifier 39 for varying the net excitation of the reel motor to increase from the base value provided by the auxiliary field winding 15.

In this instance the regulating generator 36 is provided with several field windings. A series field winding 41, connected in circuit relation with the armature 40 and the field winding 14, is utilized to substantially compensate for the magnetomotive air gap losses and maintain the generator output under balanced operating conditions. The rheostat 38 may be adjusted to vary the slope of the resistance line of the field winding 41 so that the resistance line substantially coincides with the straight portion of the saturation curve to achieve such conditions. A control field winding 42 is used to normally oppose a reference field winding 43. The control field winding 42 may be energized in accordance with the armature current of the reel motor 13, so as to be responsive to torque developed by the motor. It may, for example be connected across the interpole field windings 11 and/or a series resistor 44. A bias field winding 45 on the regulating generator is connected to be additive with respect to the control field winding 42.

The bias field winding 45 may be connected to an excitation source, such as the constant potential generator 23, through a field rheostat 47 which may be utilized to control the energization of the bias field winding 45 for determining what percentage of full load torque the reel motor is to develop. The field rheostat 47 may be adjusted to obtain different operating torque levels, dependent upon the requirements of the particular material which is being handled.

In order to provide for maintaining more nearly the same tension in the strip 17, regardless of the particular operating conditions of the reel motor 12, the energization of the reference field winding 43 may be varied by control means including resistance means 48. The effective value of the resistance means 48 may be varied depending upon whether the strip is accelerating, decelerating or running at substantially constant speed. Since the rheostat 25 is operated to vary the voltage of the main generator 20 in order to vary the speed of the main reel motor (not shown) and hence the speed of the strip 17, the contact member 30b of the "raise" pushbutton switch 30 may, for example, be connected for shunting a portion 48a of the resistance means 48 when the pushbutton switch 30 is depressed to operate the rheostat motor 28 to raise the voltage of the generator 20. The contact members 32a of the "lower" pushbutton switch 32 may be connected to shunt a portion 48b of the resistance means when the reel motor is operating at a substantially constant speed and for effectively connecting it in circuit with the reference field winding 43 when the reel motor is decelerating.

The actual torque developed by the reel motor 12 thus may be varied so as to compensate for the different torque requirements due to inertia during acceleration and deceleration. The net torque of the reel motor 12 which is applied to producing tension in the strip 17 may, therefore, be maintained more nearly at a constant value during changing operating conditions.

The control and bias field windings 42 and 45 are normally of the same polarity and, under normal operation, the magnetization produced by them is equal to and opposes the magnetization of the reference field winding 43, as shown by the polarity indicating arrows in red. Under these conditions, the regulating generator 36 operates, whenever an increase in the armature current of the reel motor indicates increased torque output of the motor, to strengthen the net energization of the main field winding 14 and hence, reduce the output torque of the reel motor 12 to the predetermined value. By changing the operating position of the bias field winding rheostat 47, the operating torque level of the reel motor 12 may be readily changed. If the energization of the bias field winding 45 is reduced, the energization required for the control field winding 42 to balance the magnetization produced by the reference field winding 43 will be increased. Hence, the armature current and the operating torque level of the reel motor will be increased. As the energization of the bias field winding 45 is increased, the energization of the control field winding 42 required to balance the effects of the reference field winding 43 is reduced and may even be reversed as indicated by the polarity indicating arrow in red, so that the armature current will be maintained at a lower value and the motor operates at a lower torque level, as illustrated by the following table:

*Torque level control*

| Per Cent Rated Reel Motor Arm. Amperes | Relative Ampere Turns | | |
|---|---|---|---|
| | Control Field Winding | Bias Field Winding | Reference Field Winding |
| 125 | 125 | 25 | −150 |
| 100 | 100 | 50 | −150 |
| 50 | 50 | 100 | −150 |
| 0 | 0 | 150 | −150 |

Because of the inertia of the reel and coiled strip, as well as of the inertia of other rotating parts of the system, the torque required from the reel motor 12 varies, depending upon whether the motor is accelerating, running at constant speed or decelerating. It is desirable to compensate for the difference in torque requirements under different operating conditions in the same amount, independently of the particular operating torque level. By using the control resistance means 48 in conjunction with the "raise" and "lower" pushbutton switches 30 and 32 which control the operation of the rheostat motor 28 to "raise" and "lower" the voltage of the main generator 20, predetermined changes in the torque of the reel motor may be effected whenever this motor is accelerated or decelerated by "raising" or "lowering" the voltage applied thereto.

Since the torque level at which the reel motor 12 operates is determined by the energization of the bias field winding 45, which is separate from the reference field winding 43, variations in the energization of the bias field winding 45 do not affect variations in the energization of the reference field winding 43, which may be produced by operation of the pushbutton switches 30 and 32. Accordingly, a predetermined change of resistance in the reference field winding circuit gives the same inertia compensation, regardless of the particular torque level for which the bias field winding 45 may be adjusted, as shown in the following table:

*Inertia compensation*

| | Per cent Rated Reel Motor Arm. Amperes | Relative Ampere Turns | | |
|---|---|---|---|---|
| | | Control Field Winding | Bias Field Winding | Reference Field Winding |
| Constant Speed | 100 | 100 | 50 | −150 |
| Accelerating | 125 | 125 | 50 | −175 |
| Decelerating | 75 | 75 | 50 | −125 |
| Constant Speed | 25 | 25 | 125 | −150 |
| Accelerating | 50 | 50 | 125 | −175 |
| Decelerating | 0 | 0 | 125 | −125 |

Thus, it will be seen that while operating under constant speed condition, the energization of the control field winding 42 will be dependent upon the armature current of the reel motor 12. An increase in armature current indicating increased tension in the strip 17 increases the energization of the control field winding 42. This increases the net output of the regulating generator 36, and increases the energization of the main field winding 14 of the reel motor. The reel motor thus tends to slow down and reduces the tension in the strip 17 to the predetermined value. Should the tension decrease, the energization of the control field winding 42 is reduced, and the reel motor tends to speed up, thus restoring the predetermined tension.

When the reel motor 12 is accelerating as, for example, during a starting operation, contact member 30b will be closed, shunting the portion 48a of the control resistor 48 from the circuit of the reference field winding 43. This increases the energization of the reference field winding and tends to speed up the reel motor. The armature current increases until the control field winding energization increases in a corresponding amount to that of the reference field winding. The increased armature current produces additional torque to overcome the inertia of the moving parts including the reel, motor and coiled strip, thus, in effect, changing the calibration of the control field winding 42 and permitting the reel motor to draw a higher armature current without causing the regulating generator 36 to attempt to reduce this increased armature current. The tension of the strip 17 is, therefore, not reduced by inertia effects.

During deceleration, contact members 32c open the shunt around the portion 48b of the control resistor 48. The energization of the reference field winding 43 is thereby decreased, thus, reducing the energization required of the control field winding 42 for balancing. The torque of the reel motor is thereby reduced so as to prevent increasing the tension in the strip 17 under these conditions.

While the operation of the system has been described for a winding reel, it is obvious that the system may also be used with a pay-off reel to unwind strip, it being only necessary to make the contact members 30b and 32a, normally closed and open, respectively, reverse the connections of the control, reference and bias field windings, and remove the rectifier 39. Increased strip tension will then cause the control field winding 42 to buck the reference field winding and reduce the energization of the field winding 14, whereby the strip tension is reduced. On accelerating, the closed contact member 30b will open, reducing the energization of the reference field winding 43 and thereby reducing the armature current required for balance. This reduces the drag torque so as to maintain the strip tension more nearly uniform.

From the above description and accompanying drawing, it will be apparent that I have provided in a simple and effective manner for utilizing a regulating generator to control the operation of a winding reel or a pay-off reel. By utilizing a separate variably energized bias field winding in the manner hereinbefore described, I provide a highly flexible reel control system which is readily adaptable for handling materials of many different sizes and characteristics which may require a wide range of different values of tension. By controlling the energization of the reference field winding in accordance with whether the voltage of the system is being increased or decreased, to accelerate or decelerate the reel motor, compensation for inertia may be readily obtained, independently of the particular torque level at which the motor is operating. This greatly facilitates handling a wide range of operating torque levels.

Since certain changes may be made in the above described construction, and different embodiments may be made of the invention without departing from the spirit or scope thereof, it is intended that all the matter contained in the above description and shown in the accompanying drawing shall be considered as illustrative and not in a limiting sense.

I claim as my invention:

1. A reel system comprising, a reel motor having a field winding and an armature disposed to be energized from a source of electrical energy, a regulating generator normally operable to effect energization of the field winding in accordance with the armature current of the motor, speed adjusting means operable to vary the voltage at which electrical energy is supplied from said source, and control means operable to vary the output of the regulating generator in accordance with predetermined operations of the speed adjusting means to effect changes in the speed of the motor.

2. In a control system for a reel motor having an armature and a field winding, a regulating generator connected to effect energization of the field winding and having a plurality of field windings, circuit means connecting one of the field windings for energization in accordance with the armature current of the reel motor, circuit means including speed adjusting means operable to effect variable energization of the reel motor armature, and additional circuit means connecting another of the field windings to a source of electrical energy for energization in the opposite sense, said circuit means including control means operable in response to predetermined operation of the speed adjusting means to effect a change of speed of the motor, said control means being effective to vary the torque of the motor.

3. For use in controlling a motor having an armature and a field winding, circuit means connected to apply a variable voltage to the armature including adjusting means to vary the voltage, a regulating generator connected to effect energization of the field winding, said regulating generator being provided with a plurality of field windings, circuit means connected to energize one of the field windings in accordance with the load on the motor, circuit means including a variable control device connecting another of the field windings for normal energization cumulatively in different degrees to effect operation of the motor under different load conditions, and circuit means including control means responsive to predetermined operation of the adjusting means to vary the speed conditions of the motor connecting another of the field windings for energization differentially with respect to the aforesaid field windings.

4. For use in controlling a motor having a field winding and an armature arranged to be energized from a variable voltage source including adjusting means operable to vary the voltage of the source, a regulating generator of the self-energizing type connected to energize the field winding and having a plurality of field windings, circuit means connecting one of said plurality of field windings for energization in accordance with the armature current of the motor, additional circuit means connecting another of said field windings for energization in opposition to the normal sense of energization of said one field winding, and inertia compensating means including variable impedance means in said additional circuit means responsive to operation of the adjusting means to effect acceleration and deceleration of the motor.

5. In a control system for a motor having an armature disposed to be energized from a source of direct current voltage and a field winding, control means operable to vary the voltage of the source, a regulating generator connected to energize said field winding having a control field winding disposed to be energized in accordance with the motor armature current and a reference field winding normally energized at a predetermined level in opposition to said control field winding, and variable impedance means connected in circuit relation with the reference field winding operable to vary the energization of said field winding from the predetermined level in accordance with operation of the control means to effect acceleration or deceleration of the motor.

6. A control system for a reel motor having an armature disposed to be energized from a direct current voltage source and a field winding comprising, a regulating generator connected to energize the field winding, said generator having a control field winding responsive to the armature current of the motor, a bias field winding connected for variable energization to vary the effective torque of the motor and a reference field winding connected in circuit with a variable impedance device for energization in opposition to the control field winding, control means operable to vary the voltage of the source, and additional control means operable in accordance with predetermined operation of the control means to effect variation of the source voltage to accelerate or decelerate the reel motor to vary the impedance device to produce a predetermined change in the torque developed by the motor.

7. The combination with a reel motor having an armature and a field winding, of means for applying a voltage to the armature, adjusting means operable to vary said voltage regulating means comprising a generator connected to energize the motor field winding and having a plurality of field windings, circuit means connecting one of said windings to a source of substantially constant voltage including a rheostat operable to vary the energization of said winding for predetermining different operating torque conditions, circuit means connecting another of the windings for cumulative energization in accordance with the armature current of the motor, additional circuit means connecting yet another of the field for energization in opposition to said other field windings from a substantially constant voltage source, and circuit means including a control resistor connected in circuit relation with the last-mentioned field winding and normally closed and normally open contact means operable to vary the energization of the last-mentioned field winding when the adjusting means is operated to raise or lower the voltage of the variable voltage source to accelerate or decelerate the motor.

8. For use with a motor having an armature energized from a variable voltage generator and a field winding, a regulating generator having an armature connected to energize the field winding and having a plurality of field windings including a field winding of the series type, disposed to maintain the output voltage under balance conditions, circuit means including an adjustable rheostat connecting one of the field windings for energization from a source of control voltage for determining the operating torque level, additional circuit means connecting another of the field windings for energization in accordance with the armature current of the motor, other circuit means connecting another of the field windings for energization in opposition to said field winding, means selectively operable to increase or decrease the voltage applied to the armature, and means selectively operable in response to operation of the aforesaid means to decrease or increase the energization of said field winding.

ALONZO F. KENYON.

REFERENCES CITED

The following references are of record in the file of this patent:

UNITED STATES PATENTS

| Number | Name | Date |
| --- | --- | --- |
| 2,357,087 | Alexanderson | Aug. 29, 1924 |